Patented Oct. 20, 1942

2,299,469

UNITED STATES PATENT OFFICE 2,299,469

TREATMENT OF BITUMINA AND ALLIED SUBSTANCES

Ladisláo D'Antal, Budapest, Hungary, assignor to Universal Process (Parent) Company Limited, Westminster, London, England, a British company No Drawing. Application June 28, 1937, Serial No. 150,863. In Germany July 26, 1935

6 Claims. (Cl. 106—274)

The present invention relates to improvements in or relating to the treatment of bitumina and allied substances of asphaltose character.

It is an object of the invention to provide an improved process of treating bitumina and allied substances of asphaltose character whereby artificial materials or plastic masses of excellent properties may be obtained. It is a further object of the invention to provide an extremely rapid method of treating bitumina and allied substances of asphaltose character.

It is a further object of the invention to provide a process of treating bitumina and allied substances of asphaltose character at elevated temperatures with one or more chemical reagents of the group comprising acids of sulphur containing at least 4 oxygen atoms and/or their anhydrides or mixtures containing one or more of these compounds under such pressure that the sulphur dioxide which would be evolved at ordinary pressure is wholly or largely caused to take part in the reaction.

It is a further object of the invention to utilise sulphuric acid of low concentration or waste acid or acid residues in the high temperature treatment of bitumina and allied substances of asphaltose character under pressure.

As examples of bitumina and allied substances of asphaltose character, there may be mentioned natural or artificial asphalts such as Trinidad asphalt or petrol bitumen, lignite-, coal-, peat-, oil shale-, wood-, resin-, fat-, and bone-tars, the pitches of such substances, montan pitch and materials containing such asphaltose substances in solution, suspension or emulsion such as heavy crude oils for example Mexican crude oil, topped crude oils, the refining and working-up residues of the above substances such as distillation, refining, hydrogenation, cracking residues as well as the residues obtained in solution processes provided with the asphaltose substances in such residues have not been destroyed for example carbonized.

The production of artificial masses by heating raw mineral oils, shale oils, natural asphalt oils and other bituminous substances, or the distillation products or residues thereof with sulphuric acid is already known. For these purposes these substances are melted together with sulphuric acid and heated until a homogeneous mass results. In this case the sulphuric acid decomposes and acts in an oxidising manner according to the equation $H_2SO_4 = H_2O + SO_2 + O$. As can be seen from the equation, only one stem of oxygen is employed for oxidation while the other part of the sulphuric acid escapes from the reaction mass in the form of water and sulphur dioxide.

The artificial mass produced in this manner possesses unfavourable physical properties which circumstance is to be ascribed to the insufficient oxidation. Thus for example the ductility becomes too low. If it is attempted to increase the oxidation by increasing the quantity of sulphuric acid, carbonisation takes place whereby the product obtained becomes brittle and fragile and presents unfavourable properties as a plastic or thermoplastic material.

In the case of oil-containing substances the reaction mass containing sulphuric acid has been heated to a temperature between 120–300° C. whereby an addition product has been formed from sulphuric acid and bituminous substances. In cases where sufficient oily constituents were present, this product separated out from the reaction mass in the form of a precipitate which was then separated from the oily constituents. If this precipitate were heated above 220° C. the sulphuric acid-bitumen addition compounds decomposed with evolution of $SO_2$, this $SO_2$ escaping from the system. The bituminous residue which had similar properties to the artificial masses described above was used as artificial asphalt.

A process is also known according to which bituminous distillation residues especially crude oil residues are heated above 250° C. with a mixture of sulphur and sulphuric acid. The sulphur reacts with the bituminous substances and produces hydrogen sulphide which enters into reaction with sulphur dioxide produced by the decomposition of the sulphuric acid. Thereby further quantities of sulphur are provided which improve the quality of the bituminous mass.

Moreover a process is known in which bituminous substances are heated with sulphuric acid and with vegetable or animal oils, fats, and also with kinds of caoutchouc, likewise to a high temperature, preferably to 180–360° C. Also in this process the sulphuric acid decomposes according to the equation $H_2SO_4 = H_2O + SO_2 + O$. The nascent oxygen oxidises the tarry bituminous substances, the sulphuric dioxide and water vapour being removed from the system. During the reaction as a result of the presence of sulphuric acid and of the action of heat, besides the oxidation also condensation and polymerisation of the substance occur and an artificial material improved with vegetable or animal oils is obtained.

Finally it has been proposed to produce artificial asphalts by subjecting hydrocarbons such as heavy oils and tars to a heat treatment with sulphur dioxide. This process gives similar results to a pitching process with additions of sulphur.

In the above processes, besides sulphuric acid expensive substances such as vegetable or animal oils, or sulphur, must be added in large quantities in order to obtain useful artificial masses. Without the use of these substances the artificial materials obtained are brittle and of low quality.

According to the hitherto known processes the bitumen-containing substance reacts with sulphuric acid, heated to temperatures between 120–160° C. with evolution of large quantities of $SO_2$; the $SO_2$ escapes with strong formation of foam from the system without reacting with the reaction material even to a perceptible degree. In the case of reaction masses which contain large quantities of sulphuric acid, the $SO_2$ which evolves, causes such a violent formation of foam that the process thereby becomes practically almost unworkable. The sulphuric acid employed exerts a very strong, reducing action on the bituminous masses, the latter are partially carbonised, so that the physical properties of the artificial material obtained are not good.

Also it has been proposed in the high pressure hydrogenation (by means of added hydrogenating gases) of distillable carbonaceous materials such as coal, bituminous sands, tar, mineral oils, shale oils, their distillation, conversion and extraction products, for the production of valuable hydrocarbons for example those of low boiling point range, to add to the initial material inorganic oxygen containing acids of sulphur or nitrogen or their anhydrides, acid salts of sulphuric acid or pyrosulphuric acid, or organic sulphonic acids together with metals of groups 4 to 8 of the periodic system or their compounds. Such processes favour the production of products of low boiling point.

The invention is based on the discovery that if bitumina or allied substances as herein defined are heated for example with sulphuric acid under pressure, so that the sulphuric acid does not react in the sense of the equation $H_2SO_4 = H_2O + SO_2 + O$ according to which the $SO_2$ is removed from the system in gaseous form, but the sulphur dioxide also takes part in the reaction, then the sulphuric acid reacts with the asphaltic, pitchy, and/or tarry constituents not only to oxidise, condense and polymerise them but also to sulphurise them to a greater or less degree, whereby the physical and chemical condition of the reaction mass produced is exceedingly advantageously influenced.

When working under pressure the quantities of water originating from the splitting up of the sulphuric acid as well also as any water introduced simultaneously with the reaction materials act favourably and moderate the violence of the reaction. In this way products of excellent quality are obtained and it is possible to vary the physical properties of the products by varying the reaction conditions. In this way artificial materials can be obtained which, together with good plasticity also possess good elastic properties and high thermoelasticity.

According to the present invention I provide a method of treating bitumina and allied substances as herein defined characterised by heating one or more of the said substances to a temperature of at least 180° C. under pressure as above set forth in the presence of acids of sulphur containing at least 4 oxygen atoms and/or their anhydrides if desired with additional substances, but without added hydrogenating gases.

The asphaltic, pitchy, and tarry constituents (which are reactive on account of their large molecular weight and their unsaturated linkages) enter into reaction with the sulphuric acid or other oxy sulphur compound of the kind defined. The reaction characteristic of the invention occurs under pressure at temperatures above 180° C. I have found that the most favourable temperatures lie between 180–360° C. I have found further that in the case of tars and asphalts, this reaction proceeds at the lower temperatures, whilst in the case of crude mineral oils and their residues for example in the case of pacura, it takes place at somewhat higher temperatures. The magnitude of the pressure is preferably so chosen that in the course of the reaction as far as possible no $SO_2$ escapes from the system. By heating the reaction mass in a closed space this condition may be fulfilled and the pressure is increased in the course of the heating by the vapours and gases evolved from the reaction mass, in general above 1 atmosphere and even above 10 atmospheres.

For assisting the uniform progress of the reaction and for preventing carbonisation occurring as a result of the heating, it is advantageous to keep the reaction mixture in movement during the reaction.

Concentrated sulphuric acid may be employed for the reaction. A limit is set however to the use of concentrated sulphuric acid over certain amounts, by the circumstance that the sulphuric acid destroys the organic substances and carbonises them, whereby the artificial material obtained becomes brittle.

For these reasons, in the case where it is desired to use more sulphuric acid, the process is preferably carried out by repeating the operation one or more times with smaller quantities of sulphuric acid. It is also possible to use for example 70% or still more diluted sulphuric acid in which case even when using large quantities of sulphuric acid, no carbonisation takes place. For example, if the distillation residue of Venezuelan crude oil is heated with 9% of concentrated sulphuric acid in an autoclave under pressure to 250° C. an artificial material with a melting point of 110° C. according to Krämer Sarnow is obtained. In the product signs of carbonisation are however already perceptible. In the case of the use of still more sulphuric acid a product is obtained of poorer quality. If however the operation is repeated three times, first with 6%, then with 4% and again with 4% of sulphuric acid, a product is obtained with a melting point of 160° C. the penetration (Din) of which at 0.25, and 46° C. was 16, 16 and 20. If the above substance is treated likewise with 14% of sulphuric acid which however has been previously diluted to 50%, a similar result is obtained in one operation.

Depending upon the quality of the sulphuric acid employed, substances with different melting points and of very good and varied qualities can be produced. For example, to 400 g. of Venezuelan crude oil distillation residue, sulphuric acid was added in the amounts given according to the following table and the mixture was heated in a closed autoclave to 250° C. with constant stirring. The heating lasted for half an hour. The maximum pressure during the reaction was 27–30 atmospheres. After the treatment the product was run off from the autoclave and the following results were obtained:

| Sulphuric acid_____cm.³__ | 10 | 12 | 14 | 16 | 18 |
|---|---|---|---|---|---|
| Melting point according to Krämer Sarnow____° C__ | 61 | 71 | 83 | 95 | 114 |
| Penetration (Din) at— | | | | | |
| 0° C_____ | | 11 | | 5 | |
| 25° C_____ | | 41 | | 20 | |
| 46° C_____ | | 70 | | 32 | |

Similar results are obtained if for example crude coal tar, or lignite tar is used as the starting material. The time of the reaction can be reduced if the raw material is forced into the autoclave which has already been pre-warmed to the temperature of the reaction. Thus for example a mixture of 400 g. coal tar and 15 cm.³ concentrated sulphuric acid may be forced into an autoclave heated to 250° C. The reaction mixture takes up the temperature of the autoclave within 10 minutes, and the pressure rises to 23 atmospheres. The reaction mass is thereupon run off warm. The melting point of the artificial material obtained is 52° C. according to Krämer Sarnow.

Instead of the normal sulphuric acid, other oxy-sulphur compounds as above defined may be employed such for example as sulphur trioxide, pyrosulphuric acid, polythionic acids, persulphuric acid, sulphur sesquioxide, sulphuric heptoxide, or fuming sulphuric acid. Also substances containing sulphuric acid for example the acid resins or acid sludge or residuary or waste acids derived from oil refining for example the sulphuric acid washed out from acid resin or acid sludge, may be employed. If desired in addition to one or more of the oxy sulphur compounds of the kind defined, organic derivatives thereof may be employed. These substances act more smoothly than free sulphuric acid. Such substances are for example sulphonic acids and sulphuric acid esters. Also the acid resins containing such substances may be employed.

The process can be made continuous for example by forcing the reaction products through a heated tube system in which case care must be taken that superatmospheric pressure prevails continuously in the system. The tube system should be so dimensioned and the heating and pressure thereof are to be so regulated that the reaction can take place completely during the passage through of the reaction mass. The reaction mixture may be previously thoroughly mixed and is then preferably introduced into the reaction space in prewarmed condition. It is also possible to proceed however by separately introducing the substances taking part in the reaction. The operation may be carried out in this way especially if the reaction substances when mixed together give a lumpy adhesive mass and in this condition can only with difficulty be forced into the system. If the substance to be worked up, when mixed with the sulphuric acid gives an adhesive mixture it is also possible to proceed by first mixing the sulphuric acid with such oily substances for example with gas oil which are well miscible with sulphuric acid without yielding an adhesive mass.

As an example of the continuous process the following may be given:

A mixture of crude coal tar with a melting point of 34° C. according to Krämer Sarnow and 10% by weight of sulphuric acid is continuously forced through a tube system heated to 200° C. In the tube system the pressure is maintained at 25 atmospheres by means of a throttle valve. The reaction material issuing through the throttle valve is collected, the parts escaping in the form of vapour condensed, and separated from the reaction residue. As a result 85% of artificial material are obtained the melting point of which is 98° C. according to Krämer Sarnow; further, 15% of reddish oil which was already to a high degree freed from the tarry, pitchy constituents and to a certain extent already refined, and which did not darken even after long storage, were obtained.

As an example for the use of sulphuric acid containing SO₃ the following is given: Coal producer tar was stirred with 8% by weight of oleum containing 20% of sulphur trioxide and heated in an autoclave to 260° C. The maximum pressure was 25 atmospheres. The operation lasted 30 minutes. The product blown off under gas pressure was an excellent pitch, lustrous after cooling, with a softening point of 63° C. according to Krämer Sarnow. In spite of this relatively high softening point, the product could be pressed in with a needle and had especially good plastic and elastic properties.

As an example for the use of acid resin, the following may be given:

Venezuelan crude oil residue topped to 300° C. is mixed with acid resin derived from the refining of lubricating oil. So much of the acid resin was taken that the sulphuric acid contained in it was 10% of the Venezuelan crude oil. The reaction product was heated in an autoclave whilst stirring to 250° C. The period of heating amounted to 30 minutes and the pressure rose to 15 atmospheres. The melting point of the artificial material obtained was 79° C. according to Krämer Sarnow, the penetration values at 0.25 and 46° C., were 3.16 and 40. If the same experiment is carried out in an open vessel, with otherwise similar reaction conditions a non-homogeneous mass is obtained and if the heating is increased, a strong carbonisation of the mass occurs and the artificial material obtained becomes brittle.

The properties (such as ductility, penetration, thermo-elasticity) of the artificial material can be influenced in the course of the reaction by the quantity and concentration employed of the reagents, further by the temperature employed, the pressure and the duration of the operation. The physical condition of these substances can also be considerably influenced if vegetable oils, animal fats and oils, fatty acids or the working up residues of such substances are added to the reaction materials. In general, not more than 25% of these substances are added to the reaction material. In practice, the additions will preferably amount to 5–10%. These substances likewise take part in the reaction and yield a completely homogeneous product. They impart to the artificial material a greater ductility and thermoelasticity. In particular, fish oils can advantageously be employed. In this case it has been found that the tars and asphalts enter more easily into reaction for instance at lower temperatures, than the crude mineral oils and their residues which yield satisfactory, for example homogeneous products only at high temperatures, in general only above 200–220° C.

*Examples of application*

|  | I | II | III | IV |
|---|---|---|---|---|
| Crude coal tar..........................g.. | 400 | 400 | 400 | 400 |
| Concentrated sulphuric acid...........cm.³.. | 20 | 20 | 20 | 20 |
| Additions.............................g.. |  |  | 40 | 40 |
| LINSEED OIL, COLZA OIL, FISH OIL | | | | |
| Reaction temperature.................C°.. | 250 | 250 | 250 | 250 |
| Pressure (atmosphere)................ | 43 | 47 | 43 | 43.5 |
| Melting point according to Krämer Sarnow C°.. | 98 | 69 | 75 | 63 |
| Penetration (Din) at— | | | | |
| 0° C............................... | 0 | 6 | 4 | 12 |
| 25° C.............................. | 0 | 9 | 7 | 15 |
| 40° C.............................. | 15 | 26 | 35 | 35 |

In a similar manner Trinidad-epuree-asphalt, the original melting point of which was 96° C. according to Krämer Sarnow has been treated in an autoclave. The penetration was 0. 400 g. of asphalt were stirred with 40 c. of fish oil while heated, whereby the original softening point of the asphalt sank to 58° C. according to Krämer Sarnow. The mixture was then stirred with 20 cm.³ of concentrated sulphuric acid, heated in an autoclave to 250° C. whereby the pressure rose to 37 atmospheres. The softening point of the product obtained was increased to 88° C. whilst the penetration at 0.25 and 46° C. according to Din was 15.35 and 65. A highly thermoelastic product was obtained which was still easily flexible and elastic even below the freezing point.

From the above examples, it is seen that when using vegetable and animal oils, the melting point is increased during the reaction to a smaller extent than if these oils were not used. The thermoelasticity is however improved considerably.

By the addition of resins the physical properties of the artificial materials especially the toughness, and ductility, can be favourably influenced. These substances likewise take part in the reaction and the artificial masses containing them are also thoroughly homogeneous. Montan wax, and ozokerite are suitable as such additions; further, vegetable resins of all kinds and resin oils are especially good. For this purpose also, tall oil obtained in the working up of cellulose can also be employed. These additions may be employed in amounts up to 25%.

If it is desired to impart to the artificial material a greater elasticity, there may be added to the reaction product, rubber-like substances such as crude rubber, latex, balata, gutta-percha, for example in the original or dissolved condition and if the mass is subjected to a temperature preferably not exceeding 200° C. the rubber-like substances are vulcanized and increase the elasticity of the artificial material. Such additions can be employed, for example in an amount up to 5%, very advantageously in the preparation of artificial asphalts.

As an example Venezuelan crude oil residue was heated with 7% by weight of concentrated sulphuric acid in an autoclave to 250° C., whereby the pressure rose to 19 atmospheres. The melting point of the artificial material obtained was 83° C. according to Krämer Sarnow. The material was mixed at about 100° C. with a quantity of about 5% of latex. The latter had a concentration of 60%. Thereupon the mass was heated to 180° C. A soft elastic material resulted with a melting point of 122–138° C. according to Krämer Sarnow.

If an oil-containing reaction product is concerned which contains constituents with lower boiling point, these may be separated from the reaction residual mass. This separation can be effected by distillation, for example by vacuum or steam distillation. A part of the oil can also be recovered by blowing out the reaction mass which is under high pressure and high temperature after the reaction and thereby condensing the oil vapours carried along with the gases.

The oily constituents may also be separated from the reaction product by centrifuging or can be dissolved out by means of a suitable selected solvent.

In this manner the melting point of the residue can be raised. The oil obtained which is for the most part freed from bituminous and tarry constituents and contains sulphur may be employed for lubricating purposes or disinfecting purposes, alone or mixed with other substances.

*Example*

Venezuelan crude oil residue was heated in an autoclave with 3% of sulphuric acid whereby a product with a softening point of 34 according to Krämer Sarnow was obtained. This product was distilled with superheated steam at 360° C. After the distillation the softening point of the residue was increased to 47° according to Krämer Sarnow. About 12% of pure practically odourless oil was obtained which contained sulphur in dissolved and colloidal condition.

The products produced by the process according to the invention present an important advantage as compared with the products produced according to other sulphuric acid processes. In the closed system, the formation of foam caused by sulphur dioxide causes no disturbance or does not occur at all. The danger of ignition during the process is small or non-existant.

Since the sulphuric acid does not react according to the equation $H_2SO_4 = H_2O + SO_2 + O$ in which reaction the $SO_2$ escapes without having reacted, but also the $SO_2$ takes part in the reaction, a complete utilisation of the sulphuric acid occurs. Thereby not only is the economy of the process increased, but the possibility of a correspondingly higher refining is given. The sulphur dioxide operates more gently and acts not only in an oxidising manner but also gives up sulphur so that also a certain sulphurising takes place. Thereby a specially well refined artificial mass can be obtained the plasticity and thermoelasticity of which is outstanding.

By the choice of the starting materials and the quantity of sulphuric acid employed for the reaction as well as the temperature, the most various artificial masses can be produced. Hard, plastic or tough artificial masses can be obtained which can be employed with advantage in road construction or for insulating purposes.

Also an artificial material can be produced which in spite of its hardness, is characterised by great toughness and flexibility. The artificial materials can finally be employed also in the lacquer industry and also for impregnating purposes.

I claim:

1. A method of treating bitumina and allied substances of asphaltose character including the step of heating the material to be treated, with up to 25% of its weight of a substance of the group consisting of vegetable and animal oils, fats and fatty acids and working up residues thereof, to a temperature of about 250° C. under sufficient pressure to prevent the material escape of sulphur dioxide from the reaction mixture in the presence of a substance of the group consisting of inorganic acids of sulphur containing at least 4 oxygen atoms and their anhydrides, and continuing heating until there is no free acid left in the reaction mass.

2. A method of treating bitumina and allied substances of asphaltose character, including the step of treating the material at a temperature of at least 200° C. under sufficient pressure to prevent the material escape of sulphur dioxide from the reaction mass with sulphuric acid until there is no free acid left in the reaction mass.

3. A method of treating bitumina and allied substances of asphaltose character, including the step of treating the material at a temperature of at least 200° C. under sufficient pressure to prevent the material escape of sulphur dioxide from the reaction mass with sulphur trioxide until there is no free acid left in the reaction mass.

4. A method of treating bitumina and allied substances of asphaltose character, including the step of treating the material at a temperature of at least 200° C. in the presence of an inorganic acid selected from the group consisting of acids containing oxides of sulphur, having at least 4 oxygen atoms and their anhydrides, under sufficient pressure to prevent the escape from the reaction of material quantities of sulphur dioxide, until there is no free acid left in the reaction mass.

5. A method of treating bitumina and allied substances of asphaltose character including the step of treating material at a temperature of 250° C. under a pressure of 27 to 30 atmospheres with sulphuric acid until there is no free acid left in the reaction mass.

6. A method of treating bitumina and allied substances of asphaltose character including the step of treating the material at a temperature of 200° C. under a pressure of 25 atmospheres with a sulphuric acid until there is no free acid left in the reaction mass.

LADISLÁO D'ANTAL.